US012688836B2

(12) United States Patent
Lee et al.

(10) Patent No.: US 12,688,836 B2
(45) Date of Patent: Jul. 21, 2026

(54) ELECTROPHORESIS DISPLAY HAVING GATE DRIVING CIRCUIT ENABLE LINES

(71) Applicant: SUPERC-TOUCH CORPORATION, New Taipei City (TW)

(72) Inventors: Hsiang-Yu Lee, New Taipei City (TW); Shang Chin, New Taipei City (TW); Ping-Tsun Lin, New Taipei City (TW); Chia-Cheng Lei, New Taipei City (TW); Kun-Yu Chen, New Taipei City (TW)

(73) Assignee: SUPERC-TOUCH CORPORATION, New Taipei City (TW)

( * ) Notice: Subject to any disclaimer, the term of this patent is extended or adjusted under 35 U.S.C. 154(b) by 0 days.

(21) Appl. No.: 19/030,710

(22) Filed: Jan. 17, 2025

(65) Prior Publication Data

US 2025/0246162 A1     Jul. 31, 2025

(51) Int. Cl.
*G09G 3/34* (2006.01)
*G02F 1/167* (2019.01)
(Continued)

(52) U.S. Cl.
CPC ............. *G09G 3/344* (2013.01); *G02F 1/167* (2013.01); *G02F 1/16766* (2019.01);
(Continued)

(58) Field of Classification Search
CPC .... G02F 1/167; G02F 1/16766; G02F 1/1685; G09G 2310/0267; G09G 2310/0291;
(Continued)

(56) References Cited

U.S. PATENT DOCUMENTS

2006/0139305 A1*   6/2006   Zhou ...................... G09G 3/344
                                                                345/107
2012/0092319 A1*   4/2012   van Veenendaal ..... G09G 3/344
                                                                345/211
(Continued)

FOREIGN PATENT DOCUMENTS

TW          200837688 A       9/2008
TW          201246149 A1     11/2012

OTHER PUBLICATIONS

Office Action dated Dec. 2, 2024 of the corresponding Taiwan patent application No. 113103010.

*Primary Examiner* — Richard J Hong
(74) *Attorney, Agent, or Firm* — HDLS IPR SERVICES; Chun-Ming Shih

(57) ABSTRACT

An electrophoresis display includes a pixel control array including pixel units, a gate control circuit electrically connected to the pixel control array. The gate control circuit includes a plurality of gate driving circuit sets, one of the gate driving circuit sets includes a plurality of gate driving circuits. One of the gate driving circuits includes gate thin film transistor where an output of one gate driving circuit is electrically connected to a gate line of the pixel control array, a plurality of control signal lines where one of the control signal lines is connected to an input of one of the gate driving circuits of one gate driving circuit set, a plurality of gate driving circuit set enable lines where one of the gate driving circuit set enable lines is connected to the enable control points of the gate driving circuits of each gate driving circuit set.

22 Claims, 11 Drawing Sheets

(51) Int. Cl.
    *G02F 1/16766*     (2019.01)
    *G02F 1/1685*     (2019.01)

(52) U.S. Cl.
    CPC ... *G02F 1/1685* (2019.01); *G09G 2310/0267*
        (2013.01); *G09G 2310/0291* (2013.01); *G09G*
                    *2310/08* (2013.01)

(58) Field of Classification Search
    CPC .. G09G 2310/08; G09G 3/344; G09G 3/3677;
           H10D 62/292; H10D 30/6755; H03K
                        19/20
    See application file for complete search history.

(56)                References Cited

U.S. PATENT DOCUMENTS

| | | | |
|---|---|---|---|
| 2013/0187149 A1* | 7/2013 | Wang | H10D 62/292 |
| | | | 257/E29.296 |
| 2015/0168799 A1 | 6/2015 | Emori | |
| 2015/0179109 A1* | 6/2015 | Hsu | G02F 1/167 |
| | | | 345/107 |
| 2016/0322015 A1* | 11/2016 | Kim | G09G 3/3677 |
| 2018/0090088 A1* | 3/2018 | He | H03K 19/20 |
| 2023/0155033 A1* | 5/2023 | Miyairi | H10D 30/6755 |
| | | | 257/43 |

\* cited by examiner

ELECTROPHORESIS DISPLAY HAVING GATE DRIVING CIRCUIT ENABLE LINES

BACKGROUND

Technical Field

The present invention relates to an electrophoretic display, in particular to an electrophoretic display with narrow frame.

Description of Related Art

The ideal electronic paper needs to have advantages of lightweight, low energy consumption, and flexibility. In addition, electronic paper can retain images even after power off. Therefore, electronic paper has been widely used in applications such as books, labels, posters, bulletin boards, etc. In the past, various electronic paper technologies have been proposed, such as electronic powder fluid (quick response liquid powder display), cholesteric liquid crystal display and other displays. However, electrophoretic displays (EPDs) are still the mainstream in view of practical considerations such as image display quality, electronic drive system design complexity and mass production stability.

Most of the commercially available electronic paper products currently on the market use electrophoretic materials as the display medium and are cooperated with thin-film transistor (TFT) substrates to form display matrix panels. Because the electrophoretic material film itself is soft, the soft electronic paper can achieve the goal of free curling when being combined with soft TFT substrate.

Refer to FIGS. 1A and 1B, which respectively shows the block diagram of a related art electrophoretic display and the block diagram of the driving module. As shown in FIG. 1A, the related art electrophoretic display 10A includes a substrate 20A and a pixel control array 30A. Based on the required resolution, the pixel control array 30A includes a plurality of pixel units such as X*Y (300*400) pixel units. This related art electrophoretic display 10A further includes a gate control circuit board 40A and a data control circuit board 50A. The gate control circuit board 40A includes, for example, N driving modules 42A, and each driving module 42A includes a gate driving IC (gate driving integrated circuit) 42B. Each gate driving IC 42B can output M gate driving signals such that the N driving modules 42A can supply all of the gate driving signals, that is, M*N=Y. Furthermore, the data control circuit board 50A includes a plurality of data driving modules 51A. Each data driving module 51A includes a data driving IC (data driving integrated circuit) 52A. The sum of the outputs of all data driving ICs 52A can output X data signal such that data driving IC 52A can control the display data for the X*Y pixel units of the pixel control array 30A Please refer to FIG. 1B again, the electronic paper has complicated diving procedure and this is hindering to traditional circuit design employing thin film transistors. Therefore, the electronic paper is generally controlled by gate driving ICs and the gate driving ICs is generally bonded to flexible substrate by chip on film package. However, this increases the cost for gate driving ICs. The process for COF packages of multiple gate driving ICs and the hot pressing process between the driving module and the electrophoretic display also influence the overall yield and further greatly increase cost. The gate driving IC 42B on each gate driving module 42A includes a shift register 43A, a latch register 44A, a level shift 45A, and an output signal selection switch set 46A to convert the input signal into M gate driving signals.

SUMMARY

It is an object of the present invention to provide an electrophoresis display to save the gate driving IC, reduce yield loss impacted by the thermal pressing process between the driving IC module and electrophoresis display, and feasible for the manufacture of electrophoresis display with narrow frame.

Accordingly, the present invention provides an electrophoretic display, comprising:

a substrate having a first surface and a second surface;

a pixel control array arranged on the second surface; and a gate control circuit electrically connected to the pixel control array;

wherein the pixel control array comprises:

a plurality of pixel units, at least one of the pixel units comprising a pixel thin film transistor, a storage capacitor and a pixel electrode;

a plurality of gate lines, at least one of the gate lines connected to gates of the pixel thin film transistors of the plurality of pixel units;

a plurality of data lines, at least one of the data lines connected to sources or drains of the pixel thin film transistors of the plurality of pixel units; and wherein the gate control circuit comprises:

a plurality of gate driving circuit sets, one of the gate driving circuit sets comprising a plurality of gate driving circuits, one of the gate driving circuits comprising a gate thin film transistor, wherein at least one of the gate thin film transistors is low conduction resistive thin film transistor, an output terminal of the gate driving circuit connected to the gate line of the pixel control array;

a plurality of control signal lines, one of the control signal lines is connected to an input end of one of the gate driving circuits of the gate driving circuit sets;

a plurality of gate driving circuit set enable lines connected to enable control nodes of the gate driving circuits of the gate driving circuit set.

DETAILED DESCRIPTION

Figure 1A:
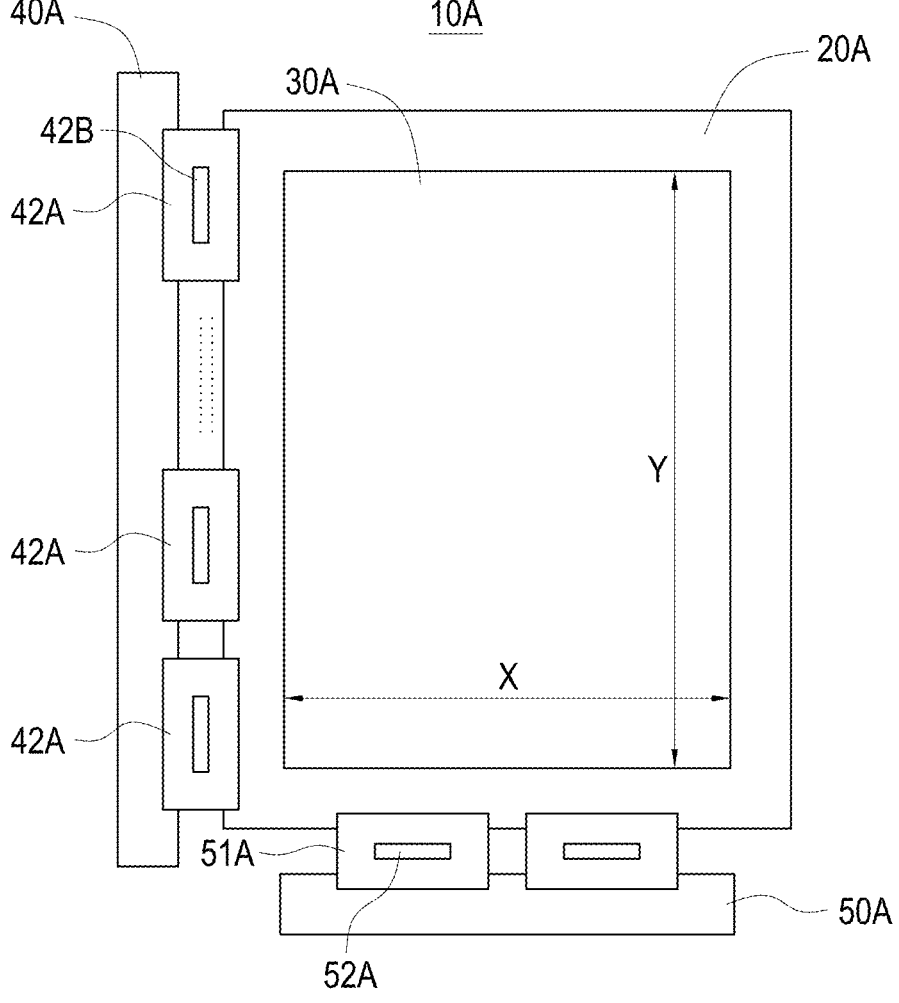
FIG. 1A shows the block diagram of a related art electrophoretic display.
Figure 1B:
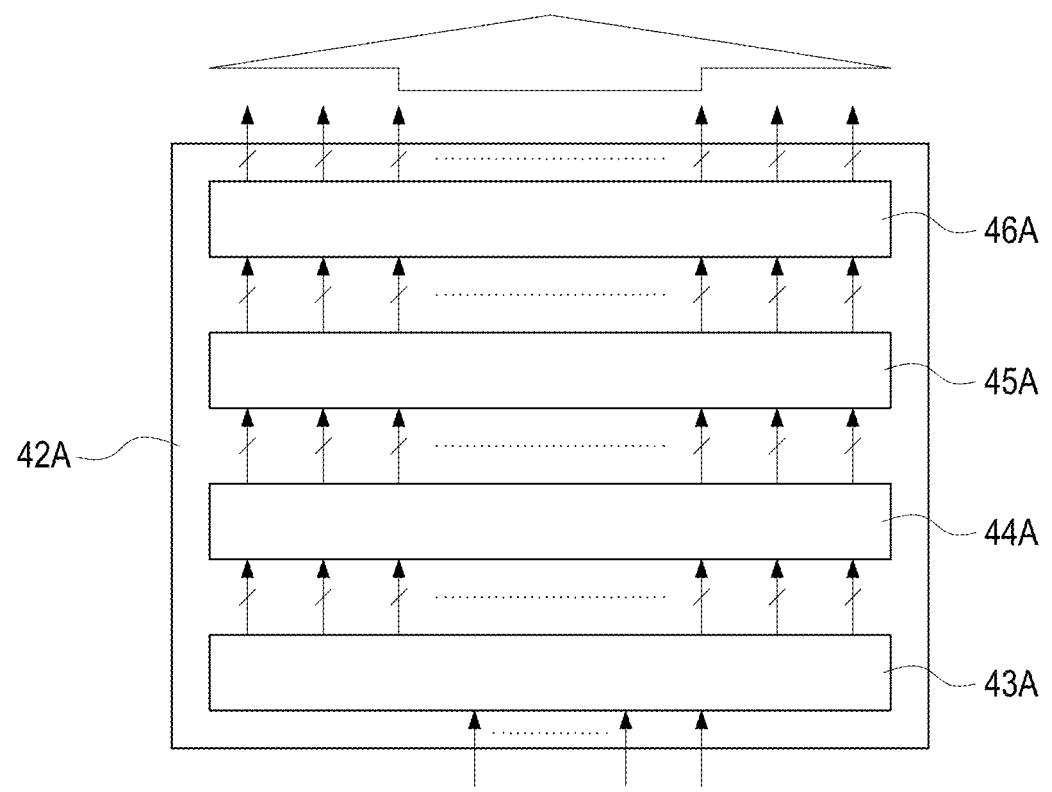
FIG. 1B shows the block diagram of the related art driving module.

It is to be understood that the terms for indicating positions and the location relation, for example "front", "rear", "left", "right", "front end", "rear end", "distal end", "longitudinal direction", "lateral direction", "vertical direction", "top" and "bottom", are based on the positions and the location relation disclosed in the drawings, and only used for disclosing the present invention and not used for indicating or implying the specified location of the device or the components or the specified structure and operation in certain location, thus the present invention is not intended to be limiting.

For example, the terms of "first", "second", "third", "forth" and "fifth" are used for illustrating each unit, component, area, layer and/or part. The component, the unit, the area, the layer and/or the part are not limited by the terms. These terms are only used for separating the element, the assembly, the area, the layer, or the part. Unless being clearly indicated according to the whole specification, the terms for example "the first", "the second", "the third", "the fourth" and "the fifth" are not used for implying the order or sequence.

As used herein and not otherwise defined, the terms "substantially" and "approximately" are used to describe and describe small changes. When used in connection with an event or situation, the terms may include the precise moment at which the event or situation occurs, as well as the event or situation occurring to a close approximation. For example, when combined with a numerical value, the terms may include a range of variation equal to or less than ±5% of the numerical value, such as equal to or less than ±4%, equal to or less than ±3%, equal to or less than ±2%, equal to or less than ±1%, equal to or less than ±0.5%, equal to or less than ±0.1%, or equal to or less than ±0.05%.

The technical contents of the present invention will become apparent with the detailed description of embodiments and the accompanied drawings as follows. However, it shall be noted that the accompanied drawings are for illustrative purposes only such that they shall not be used to restrict the scope of the present invention.

The driving scheme used in electronic paper is much more complicated than that of LCD. Therefore, the electronic paper has more requirements for driving functions. For the gate driving of LCD, each scan line needs only to turn on sequentially, and it has simple timing control. However, the driving of the electronic paper needs to consider initialization, regional refresh, and post-refresh processing. Therefore, the gate driving control for the electronic paper needs to include various functions such as: all gate lines outputting TFT on level, all gate lines outputting TFT off level, partial gate lines outputting TFT on level, partial gate lines outputting TFT off level, gate lines sequentially outputting TFT on level, and retaining TFT off level after power off and so on.

Figure 2A:
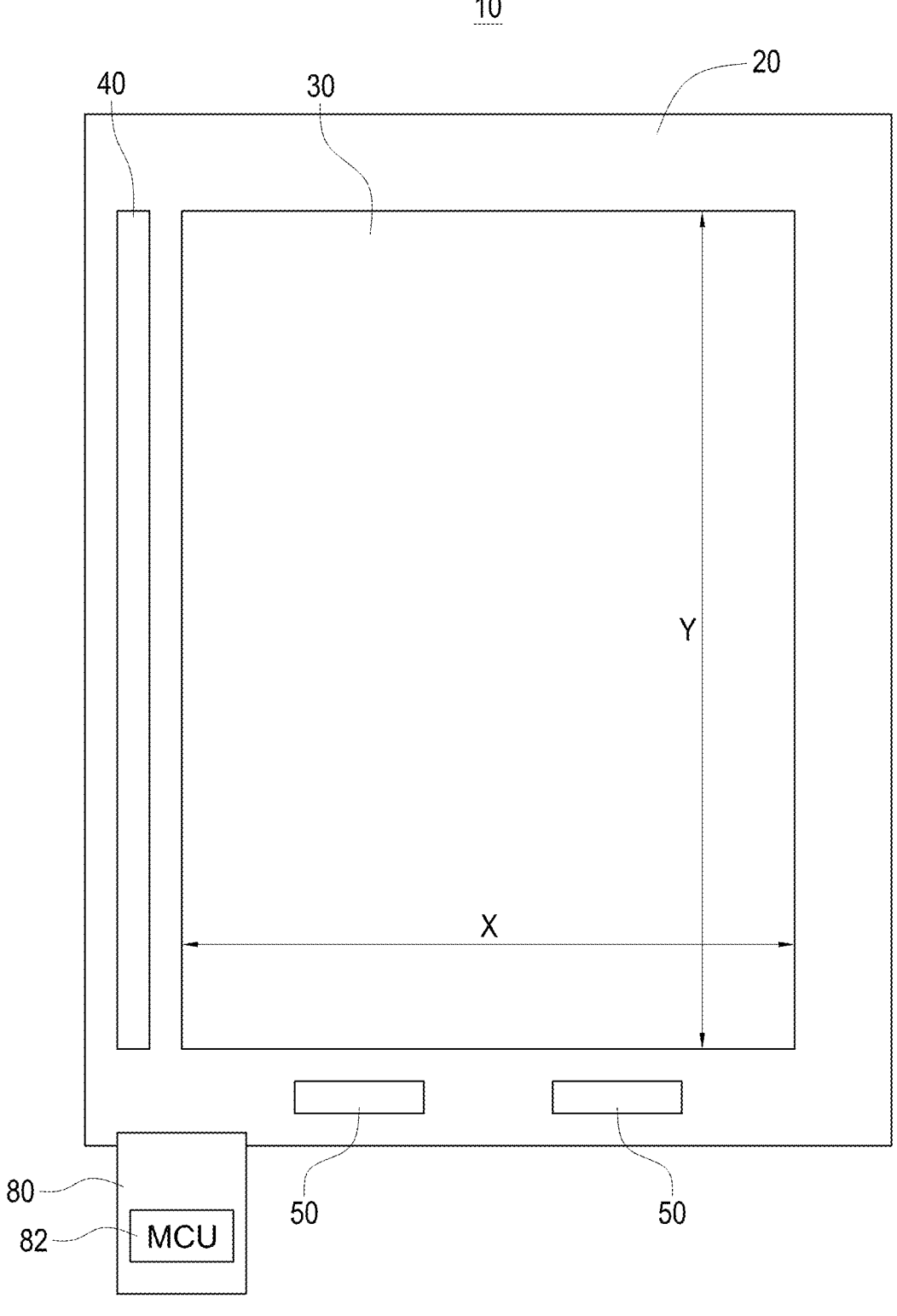
FIG. 2A shows the block diagram of the electrophoretic display according to an embodiment of the present invention.
Figure 2B:
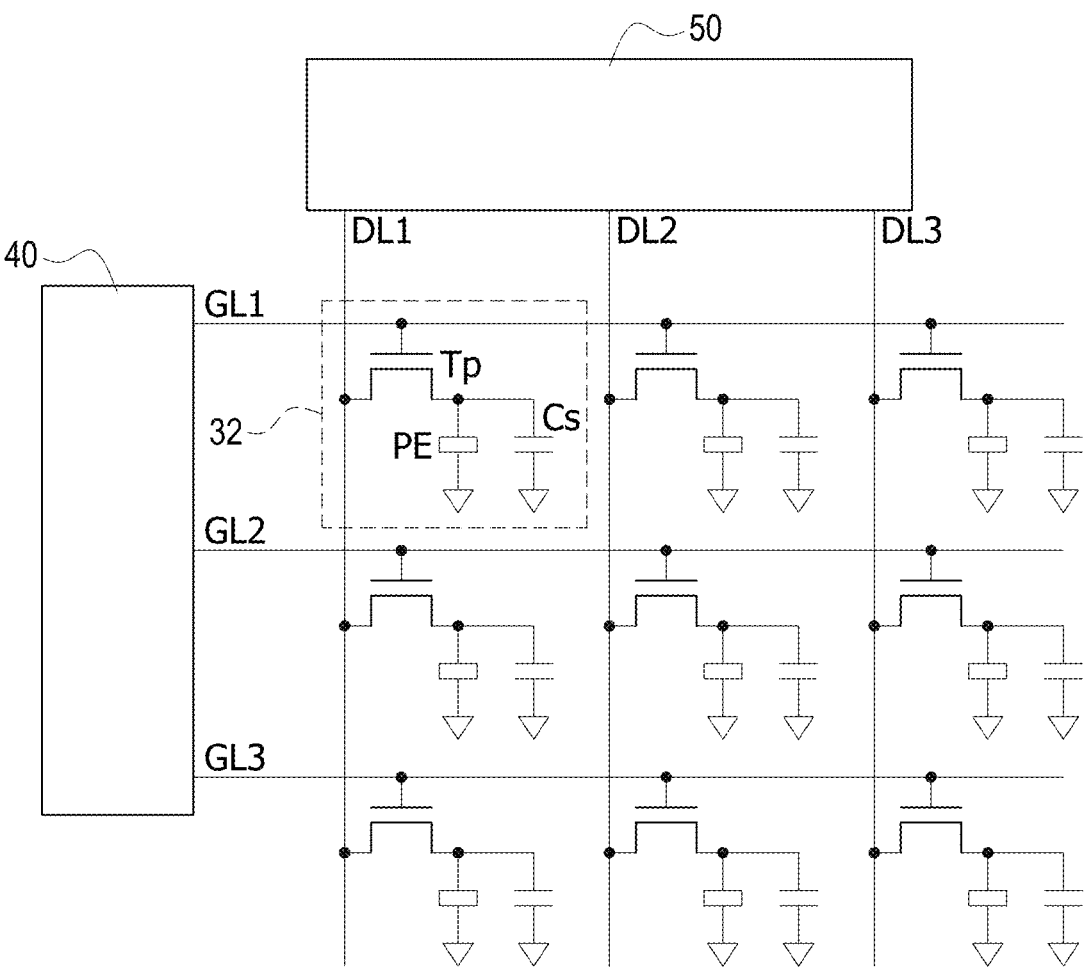
FIG. 2B is a schematic view of the pixel control array according to an embodiment of the present invention.

FIG. 2A shows the block diagram of the electrophoretic display according to an embodiment of the present invention. The electrophoretic display 10 includes a substrate 20 and a pixel control array 30. Based on the required resolution, the pixel control array 30 includes a plurality of pixel units such as X*Y (300*400) pixel units 32 as shown in FIG. 2B. The electrophoretic display 10 further includes a gate control circuit 40 and a data driving circuit 50. Referring to FIG. 2B, each pixel unit 32 includes at least one pixel thin film transistor (TFT) Tp, a storage capacitor Cs and a pixel electrode PE. The pixel control array 30 further includes Y gate lines GL (FIG. 2B only show partial gate lines GL1~GL3) and X data lines DL (FIG. 2B only show partial data lines DL1~DL3). The Y gate lines are electrically connected to the gate of the pixel TFT Tp and the output of the gate control circuit 40 respectively; and the X data lines DL are electrically connected to the source or drain of the pixel TFT Tp and the output of the data driving circuit 50. When the data needs to be written to a location in the pixel control array 30, for example, the location corresponding to (GL1, DL1), the electrophoretic display 10 uses the gate control circuit 40 to set the voltage level of the gate line GL1 to logic high to turn on the first gate line, and to set the voltage level of the remaining gate lines GL to logic low. Besides, the electrophoretic display 10 uses the data driving circuit 50 to write the data to the pixel electrode corresponding to the location (GL1, DL1) through the data line DL1 and charge or discharge the storage capacitor Cs to set the corresponding displayed data at location (GL1, DL1).

Furthermore, with reference to FIG. 2A, a flexible circuit board 80 is attached to the substrate 20, and a control integrated circuit (IC) 82 is arranged on the flexible circuit board 80 and is electrically connected to the gate control circuit 40 and the data driving circuit 50 to control the gate control circuit 40 and the data driving circuit 50.

Figures 2C, 2D:
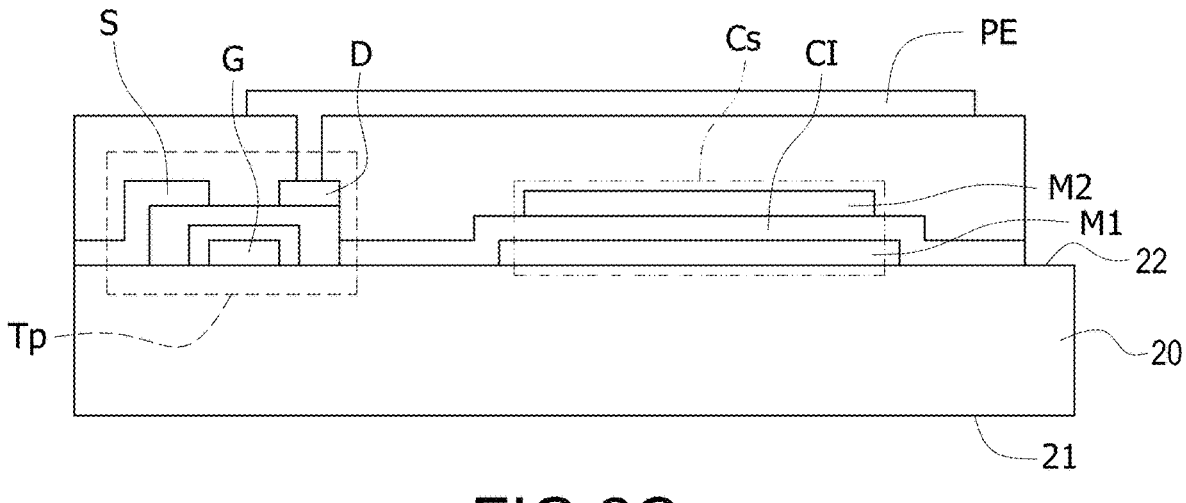
FIG. 2C is a schematic view showing the pixel thin film transistor and related components according to an embodiment of the present invention.
FIG. 2D is a schematic view showing the gate thin film transistor and related components according to an embodiment of the present invention.

With reference to FIG. 2C, the pixel control array 30 is arranged on the substrate 20. The substrate 20 includes a first surface 21 and a second surface 22. More specifically, the pixel control array 30 is arranged on the second surface 22 of the substrate 20. This figure is used to show the main components constituting the pixel unit 32, namely, the pixel TFT Tp, the storage capacitor Cs, and the pixel electrode PE. Besides, the pixel control array 30 includes a plurality of pixel units 32. As clearly shown in FIG. 2C, the pixel control array 30 is arranged on the second surface 22 of the substrate 20.

With reference to FIG. 2D, this figure shows the gate TFT Tg and related components. The gate TFT Tg of the gate driving circuit set 42 is arranged on the second surface 22 of the substrate 20 and is electrically connected to the output equivalent capacitor Cg. The output equivalent capacitance of the output equivalent capacitor Cg is provided by the capacitance of the capacitor comprising the two conductive layers M1 and M2 formed in the TFT process and sandwiching the insulation layer CI.

According to an embodiment of the present invention, the gate TFT Tg of the gate driving circuit set 42 is a low conduction-resistance thin film transistor, and the conduction resistance thereof is not greater than 1M ohm. According to an embodiment of the present invention, the conduction resistance of the gate TFT Tg is not greater than 100K ohms. According to an embodiment of the present invention, the W/L (channel width/channel length) ratio of the gate TFT Tg is greater than 50/1, thereby providing the required low on-resistance.

Figures 3A, 3B:
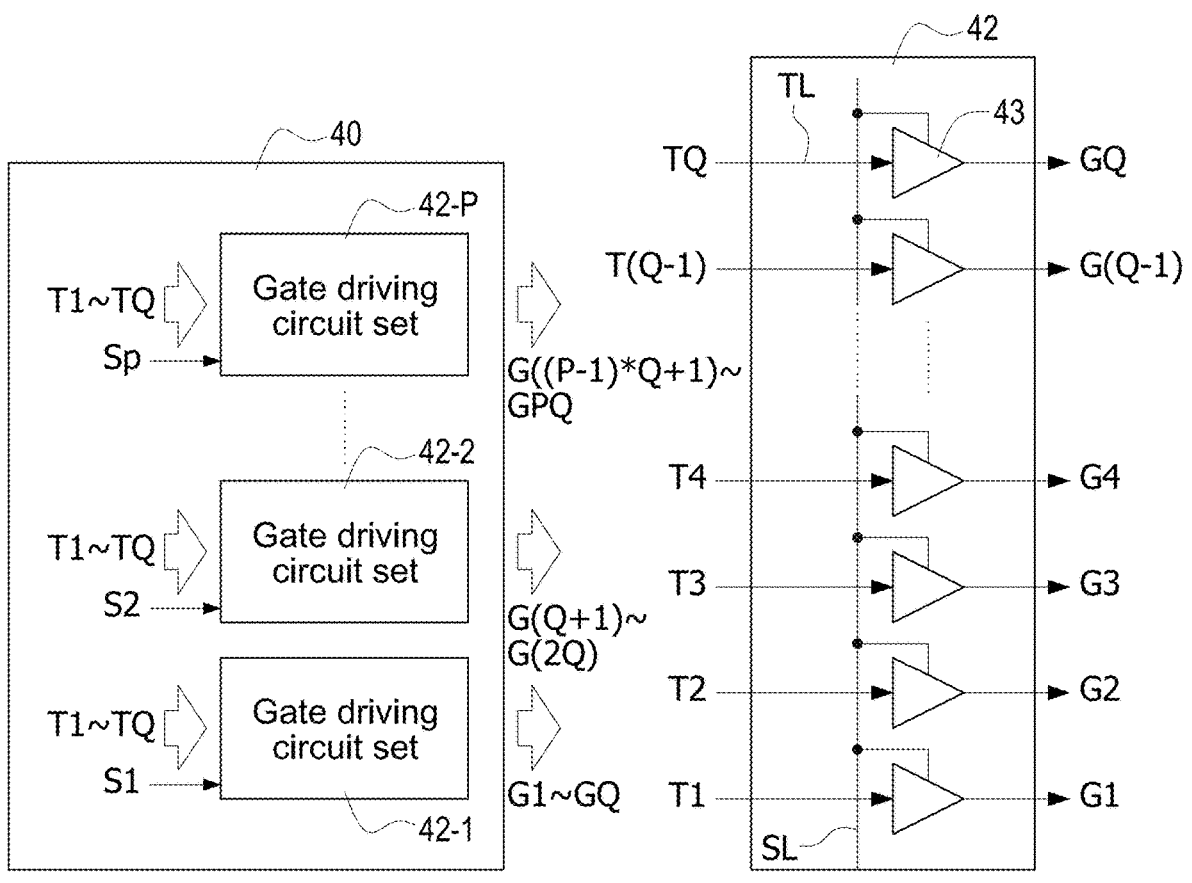
FIG. 3A is a block diagram showing the gate control circuit according to an embodiment of the present invention.
FIG. 3B is a block diagram showing the gate driving circuit set according to an embodiment of the present invention.

With reference to FIGS. 3A and 3B, according to an embodiment of the present invention, the gate control circuit 40 includes a plurality of gate driving circuit sets 42_1 . . . 42_P, for example, P gate driving circuit sets. Each gate driving circuit set 42 includes a plurality of gate driving circuits 43. Each gate driving circuit set 42 receives Q control signals T1~TQ and output Q gate driving signals. For example, the first gate driving circuit set 42_1 receives Q control signals T1~TQ and outputs Q gate driving signals G1~GQ. The second gate driving circuit set 42_2 receives Q control signals T1~TQ and outputs Q gate driving signals G(Q+1)~G(2Q). The Pth gate driving circuit set 42_P receives Q control signals T1~TQ and outputs Q gate driving signals G ((P−1)Q+1)~GPQ. By the gate control circuit 40 of the present invention, P*Q gate driving signals can be provided with just receiving Q control signals T1~TQ. In other words, in the present invention, Y=P*Q. Furthermore, with reference to FIG. 5A, according to an embodiment of the present invention, a gate driving circuit set 42 may include, for example, Q gate TFTs Tg, that is, each gate driving circuit 43 includes a gate TFT Tg. Besides, the gate of each gate TFT Tg (that is, the enable node EN of the gate driving circuit 43) is connected to the corresponding gate driving circuit enable line SL, and the source or the drain of the gate electrode of each gate TFT Tg is electrically connected to an output equivalent capacitor Cg.

Figures 5A, 5B:
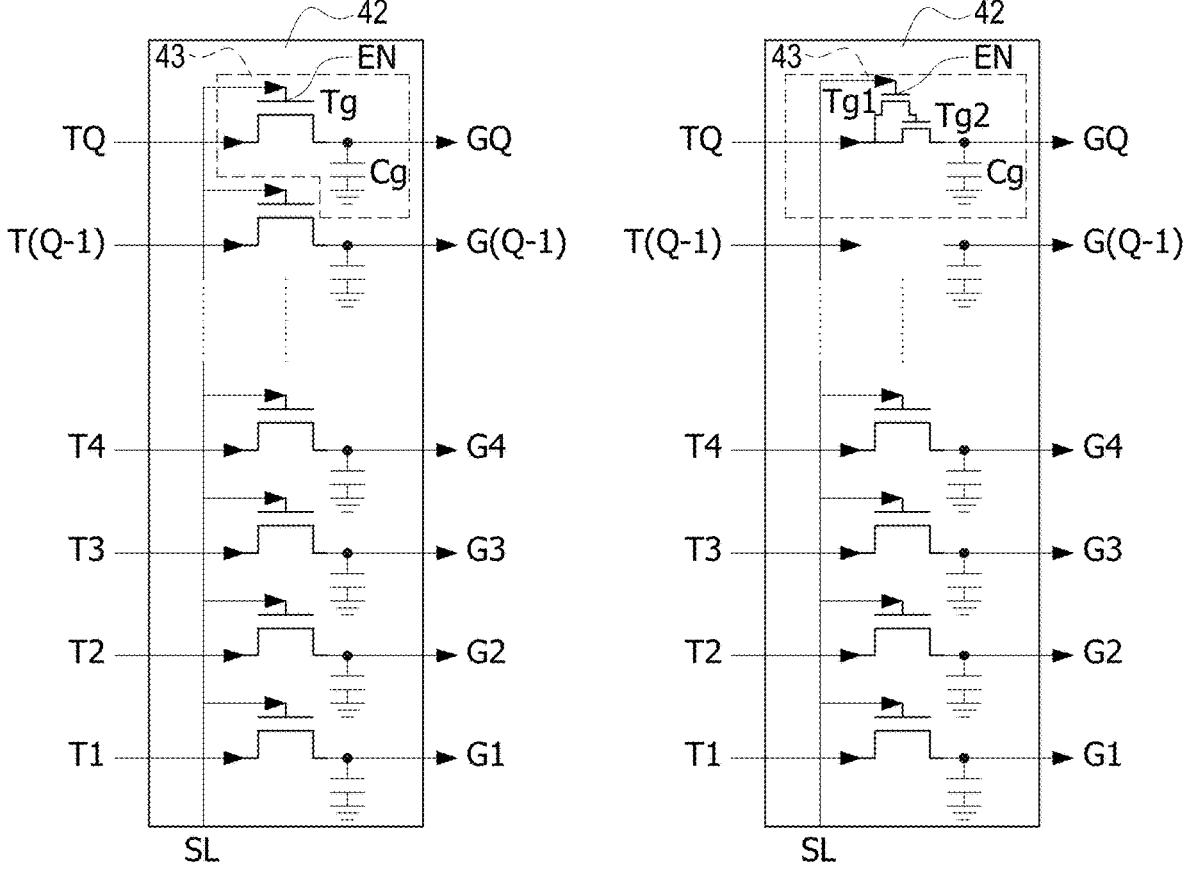
FIG. 5A is a circuit diagram showing the gate driving circuit set according to an embodiment of the present invention.
FIG. 5B is a circuit diagram showing the gate driving circuit set according to another embodiment of the present invention.

FIG. 5B shows the circuit diagram of a gate driving circuit set according to another embodiment of the present invention. A gate driving circuit set 42 includes Q gate driving circuits 43. Each gate driving circuit 43 includes a front-stage thin film transistor (TFT) Tg1 and a rear-stage thin film transistor (TFT) Tg2 with a low conduction resistance. The enable node EN of the gate driving circuit 43 is the gate of the front-stage TFT Tg1 and the source or drain of each rear-stage TFT Tg2 is electrically connected to an output equivalent capacitor Cg.

According to an embodiment of the present invention, the rear-stage TFT Tg2 of the gate driving circuit set 42 is a low conduction resistance TFT and the conduction resistance thereof is not greater than 1M ohm. According to an embodiment of the present invention, the conduction resistance of the rear-stage TFT Tg2 is not greater than 100K ohms. According to an embodiment of the present invention, the channel width/channel length (W/L) ratio of the rear-stage TFT Tg2 is greater than 50/1, thereby providing the required low on-resistance.

Figures 5C, 5D:
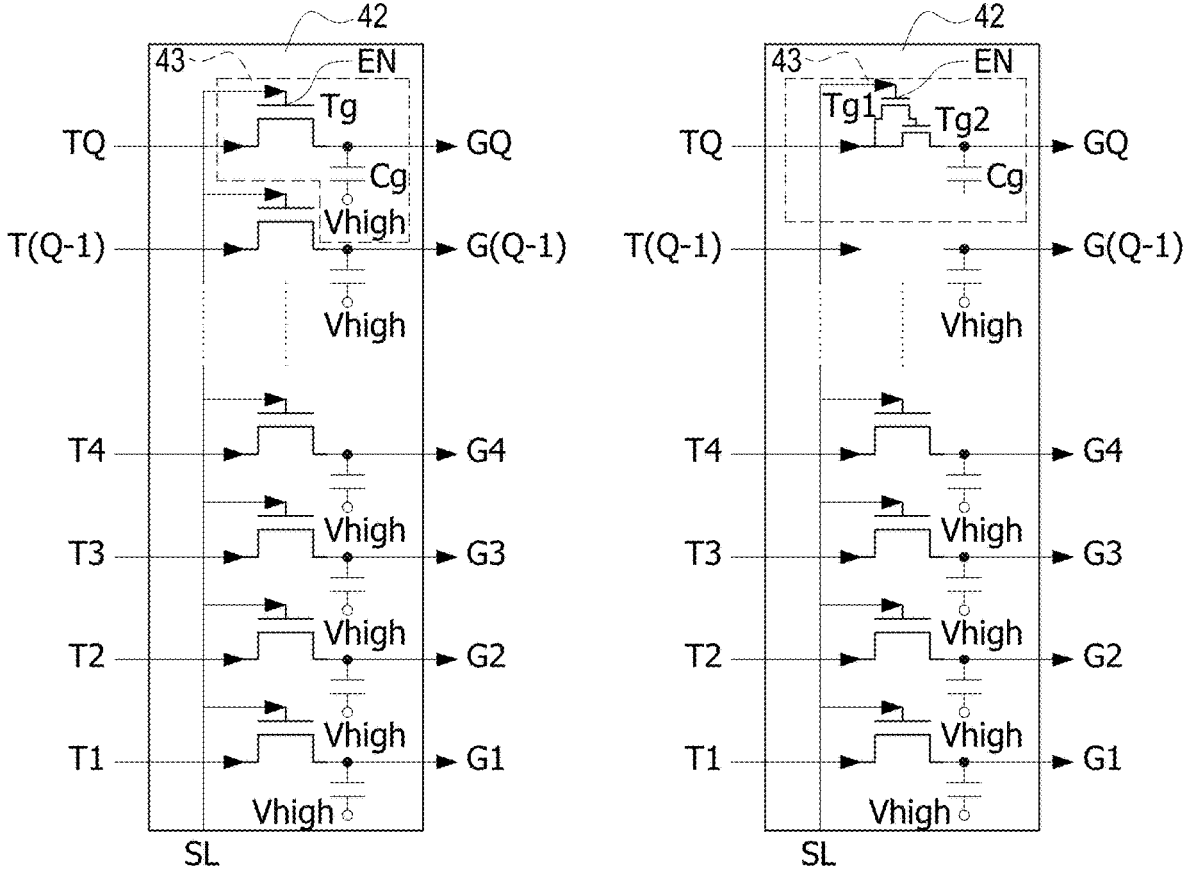
FIG. 5C is a circuit diagram showing the gate driving circuit set according to still another embodiment of the present invention.
FIG. 5D is a circuit diagram showing the gate driving circuit set according to still another embodiment of the present invention.

FIG. 5C and FIG. 5D respectively shows the circuit diagrams of a gate driving circuit set according to other embodiments of the present invention. The gate driving circuits set shown in FIG. 5C and FIG. 5D is respectively different with those shown in FIG. 5A and FIG. 5B in that the source or drain of each gate TFT Tg in FIGS. 5C and 5D is electrically connected to an end of the output equivalent capacitor Cg, and the other end of the output equivalent capacitor Cg is connected to a positive voltage, for example, a positive power supply terminal Vhigh. Therefore, the end of the output equivalent capacitor Cg, which is connected to the source or drain of the gate TFT Tg or Tg2 can accumulate negative charges, thus ensuring that the thin film transistor is completely open-circuited when the power is turned off.

In following description, the logic high level is the high voltage that can turn on the thin film transistor, and the logic low level is the low voltage that can turn off the thin film transistor.

Figure 4:
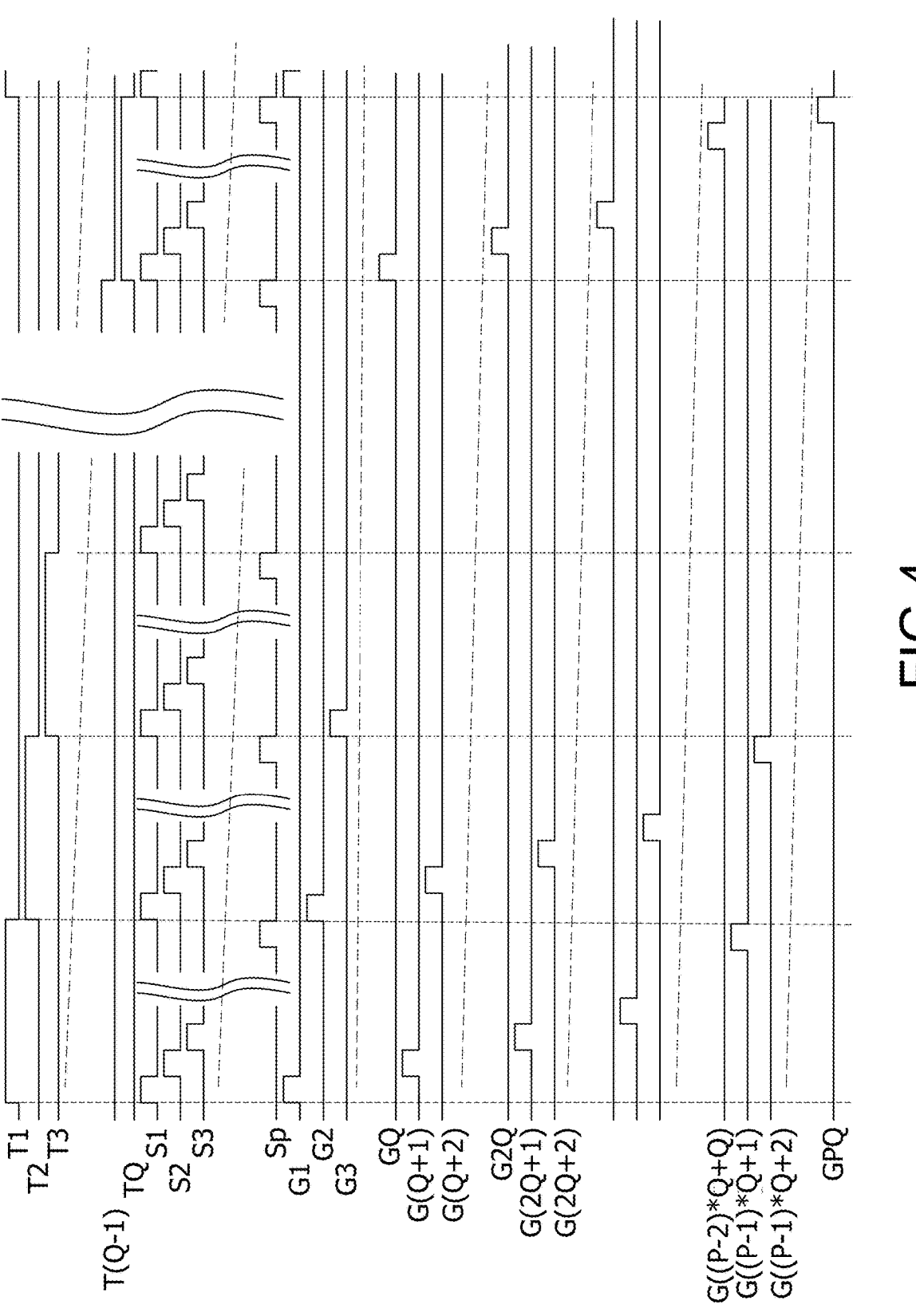
FIG. 4 is a timing diagram showing the operation of the electrophoretic display according to an embodiment of the present invention.

As mentioned above, with reference together to FIGS. 2A, 3A and 4, the electrophoretic display 10 can output the gate driving circuit enable signals S1-SP through the gate driving circuit enable line SL to sequentially select and enable the first gate driving circuit set 42_1, the second gate driving circuit set 42_2 . . . the Pth gate driving circuit set 42_P. With reference to FIG. 3A, when the gate driving circuit set enable signal S1 is in a logic high level, the first gate driving circuit set 42_1 receives the Q control signals T1~TQ and outputs the Q gate driving signals G1~GQ. For example, when the gate driving circuit set enable signal S1 is in a logic high level, the control signals T1, T2, and T3 are 1, 0, and 0 respectively, and the gate driving signals G1, G2, and G3 are 1, 0, and 0 respectively.

When the gate driving circuit set enable signal S2 is in a logic high level, the second gate driving circuit set 42_2 receives the Q control signals T1~TQ and outputs the Q gate driving signals G(Q+1)~G(2Q). For example, when the gate driving circuit set enable signal S2 is in a logic high level and the control signals T1, T2, and T3 are 1, 0, and 0 respectively, then the gate driving signals G(Q+1), G(Q+2), G(Q+3) are 1, 0, 0 respectively. When the gate driving circuit set enable signal SP is in a logic high level, the P-th gate driving circuit set 42_P receives the Q control signals T1~TQ and outputs the Q gate driving signals G((P−1)*Q+ 1), G((P−1)*Q+2). For example, when the gate driving circuit set enable signal SP is in a logic high level and the control signals T1 and T2 are 1 and 0 respectively, then the gate driving signals G((P−1)*Q+1), G((P−1)*Q+2) are 1, 0 respectively, and so on. When other enable signals are in low level, the gate driving circuit sets electrically connected to the enable signal are of high impedance, and the voltage level on the gate line connected to the high impedance output is the voltage of the capacitor Cg shown in FIGS. 5A, 5B, 5C and 5D. Therefore, the output states of the gate driving circuit set are respectively logic high level, logic low level and high impedance output state. When the gate driving circuit set outputs logic high level, the capacitor Cg will store the level of logic high state. When the gate driving circuit set outputs logic low level, the capacitor Cg will store the level of logic low state. When the gate driving circuit set outputs high impedance, the capacitor Cg keeps its stored potential.

By the above gate control signal scheme, the number of connection lines connected to the gate control circuit 40 can be greatly reduced. Taking the example that the pixel control array 30 has 300*400 pixel units 32 (that is, 120,000 pixel units) as an example, the conventional technology requires 300 gate lines to perform gate driving control. According to the present invention, it only needs 15 input control signal lines (Q=15) and 20 gate driving circuit set enable lines (P=20), that is, P*Q=300. Simply put, the present invention only needs P+Q=35 signal lines.

In addition, for electrophoretic displays, most display modes are static, that is, many pixels do not need to change the display content. For example, for the blank portion of e-book display or the screen display in handwriting mode, many pixels do not need to change the display content. According to the above-mentioned embodiments of the present invention, the gate driving circuit set enable signals S1~SP and the input control signals T1~TQ can be adjusted according to the required changes in the pixel positions and written values. The present invention does not need to perform writing actions to all pixel units, thus more effectively controlling the display content of the electrophoretic display.

For example, if the user wants to write a straight line segment and it assumes that the electrophoretic display 10 needs to write, for example, 100 pixels. Besides, it assumes that the writing operation need 20 gate lines and 5 data lines, and 4 frame to complete the straight line segment. The 20 gate lines may be allocated to the gate driving circuit set 42_m connected to 15 input control signal lines, and the gate driving circuit set 42_m+1 connected to 15 input control signal line. More particularly, in this scenario, it further assumes the fourth input of the gate driving circuit set 42_m needs to be controlled such that the input end T4 of the gate driving circuit set 42_m is in logical high level while the other input ends of the gate driving circuit set 42_m are in logical low level. The enable line Sm of the gate driving circuit set 42_m is in a logic high level and the other enable lines are in a logic low level. Namely, the data driving IC only needs to write data through the data lines for the content to be changed and keep high impedance to the data lines for the content to be not changed. The above process is repeated for 20 times to complete the data writing for a frame and the process for the four frame is conducted in similar manner to finish the requited screen update for 100 pixels. By above screen update of the present invention, it only needs at most 20*4=80 data line writing operations. In comparison with the prior art, which needs 300*4=1200 writing operations for all gate lines, the present invention can significantly reduce the number and time of writing operations.

The above example is a simplified example of the display operation of the electrophoretic display 10. However, apparent from this example, the structure of the present invention can greatly simplify the number of writing times and duration for partially changed display images.

Referring to FIGS. 5C and 5D, the gate driving needs initialization before screen update. For initialization of gate driving, all outputs of the gate driving circuit enable lines SL are logic high level and all inputs of the gate driving circuit sets 42 are logic low level. At this time, all of the equivalent capacitors Cg are changed by charging or discharging to logical low level. The other end of the equivalent capacitor Cg is electrically connected to the highest positive power terminal Vhigh to accumulate more negative charges on the end of the equivalent capacitors Cg electrically connected to the gate line. Besides, the other end of the equivalent capacitor Cg may also be electrically connected to a level not smaller than zero volt or a variable voltage level. With reference also to FIG. 6D, according to an embodiment of the present invention, the variable level is a programmable voltage level Vp.

Figure 6A:
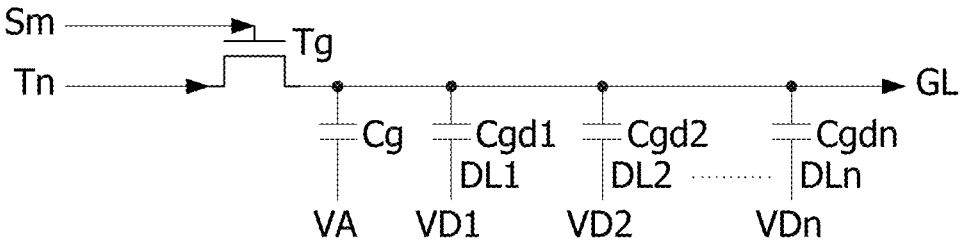
FIG. 6A is a schematic view showing the circuit for parallel-connected capacitors formed between the intersections between gate line and data lines.
Figure 6B:
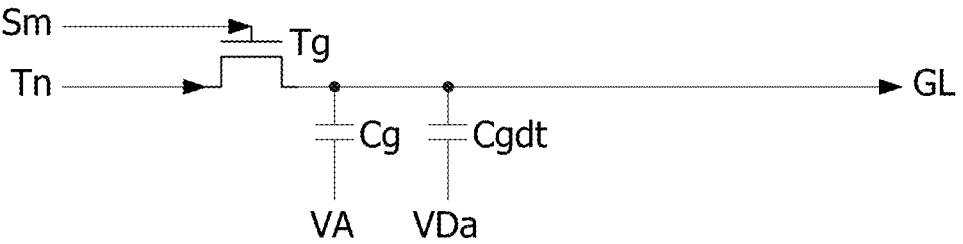
FIG. 6B is a schematic view showing the equivalent capacitance for parallel-connected capacitor formed between the intersection between gate line and data lines.
Figure 6C:
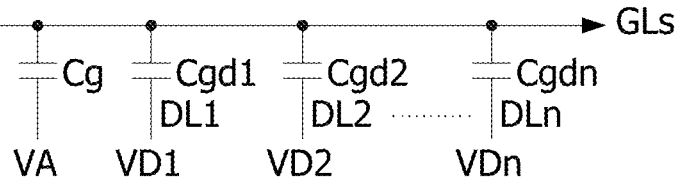
FIG. 6C is a schematic view for the sampling gate line GLs.
Figure 6D:
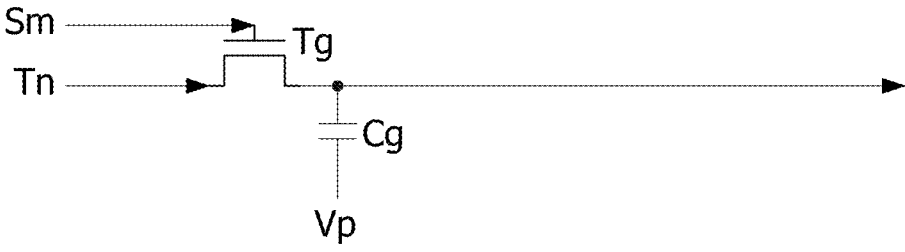
FIG. 6D shows the circuit diagram for the output equivalence capacitor and the variable voltage level.
Figure 6E:
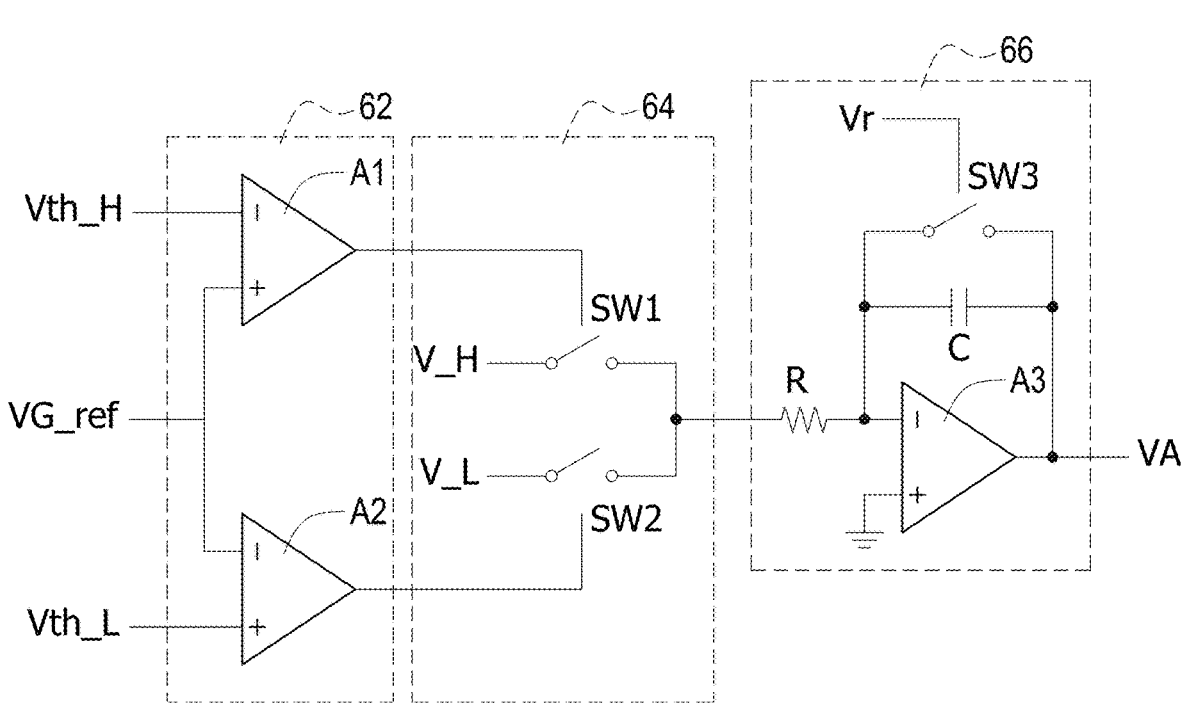
FIG. 6E shows the circuit diagram for the compensation circuit according to an embodiment of the present invention.

With reference to FIGS. 6A, 6B and 6C, the intersect points between any one of the gate line GL and multiple data lines DL respectively forms a capacitor Cgd1, Cgd2 . . . Cgdn. Those capacitors superimpose the voltage variations VD1, VD2~VDn from the data lines to the gate line and the equivalent circuit of those capacitors Cgd1, Cgd2 . . . Cgdn can be simplified to the aggregated capacitor Cgdt as shown in FIG. 6B. Namely, the average voltage variation VDa from each data line will be superimposed to the gate line GL through the aggregated capacitor Cgdt. The electrophoretic display has erroneous display when the signal superimposed to the gate line GL is large enough to turn on the thin film transistor that should be turned off. For solving the above problem, as shown in FIG. 6E, according to an embodiment of the present invention, a tracking compensation circuit 60 is arranged between a sampling gate line GLs and the output equivalent capacitor Cg of each gate driving circuit set 42. The tracking compensation circuit 60 includes a comparison circuit 62, a selection circuit 64 and an integration circuit 66. The output voltage VA of the tracking compensation circuit 60 changes with the gate line level changes. When the gate line sampling signal VG_ref output by the sampling gate line GLs is greater than a preset critical voltage value (first critical voltage value) Vth_H, the amplifier A1 turns on the switch SW1 and a current of a weighted voltage (first weighted voltage) V_H flows to the capacitor C of the integrating circuit 66 to reduce the output voltage VA. When the voltage of the output voltage VA decreases, the voltage levels of all gate lines with high output impedance are pulled down until the sampling signal VG_ref is less than the critical voltage value Vth_H. When the gate line sampling signal VG_ref output by the sampling gate line GLs is smaller than another preset critical voltage value (second critical voltage value) Vth_L, the amplifier A2 turns on the switch SW2 and a current of a weighted voltage (second weighted voltage) V_L flows to the capacitor C of the integrating circuit 66 to increase the output voltage VA. When the voltage of the output voltage VA increases, the voltage levels of all gate lines with high output impedance are pulled up until the sampling signal VG_ref is greater than the critical voltage value Vth_L. As shown in FIG. 6E, the output voltage of the integrating circuit 66 changes with the change of the sampling gate line potential (VG_ref) in a complementary manner such that the voltage on the output equivalent capacitors of all gate lines with high output impedance is limited between the weighted voltage Vth_H and the weighted voltage Vth_L. Therefore, the voltages of the weighted voltage Vth_H and the weighted voltage Vth_L are such set that the voltages of the weighted voltage Vth_H and the weighted voltage Vth_L will not turn on the gate TFT Tg and the level of the weighted voltage Vth_H is smaller than the level of the weighted voltage Vth_L. Besides, the level of the weighted voltage V_H is a positive potential greater than 0, and the level of the weighted voltage V_L is a negative potential less than 0.

With reference to FIG. 6D, in another embodiment of the present invention, the other end of the equivalent capacitor Cg is connected to a programmable level Vp. The programmable level is an optimal compensation level calculated according to the current control parameters for the data lines and gate lines of the display.

During the screen update period, after finishing the driving for each gate line and the data line writing, the input terminal of the gate driving circuit set 42 needs to be changed from a logic high level to a logic low level until the voltage level of the corresponding equivalent capacitor reaches to logic low level. Alternatively, the initialization process for gate driving can be conducted again to change the voltage levels for all of the equivalent capacitors Cg to logic low level to prevent the memory effect of the equivalent capacitors Cg, where the previous gate line is also turned on simultaneously when the next gate line is turned on and incorrect data is written.

During the above image update period, the output terminals of the plurality of gate driving circuit sets 42 have three types of outputs, namely high voltage level, low voltage level and high output impedance. More specifically, according to an embodiment, at least one output of the gate driving circuit sets 42 is high impedance at least one time during the image update period. According to another embodiment, the outputs of 50% of the gate driving circuit sets 42 are high impedance at least one time during the image update period. According to still another embodiment, the outputs of 50% of the gate driving circuit sets 42 are of low voltage level at least one time during the image update period. According to still another embodiment, at least one output of the gate driving circuit sets 42 is of high voltage level at least one time during the image update period. According to still another embodiment, the outputs of all gates in the gate driving circuit sets 42 are low voltage level at least one time during the image update period to initialize the storage capacitor.

Besides, for activating at least one gate line GL in the pixel control array 30, the plurality of gate driving circuit sets 42 needs to be controlled many times by using the gate address value of the pixel unit 32 to ensure the correct voltage level of the gate line GL, and the time interval between two controls is not greater than 90% of the RC constant provided by the output impedance of the gate driving circuit 43 and the capacitance of the output equivalent capacitor Cg.

In the above embodiments, the pixel thin film transistors and the gate thin film transistors are all amorphous silicon thin film transistors or organic thin film transistors or indium gallium zinc oxide (IGZO) thin films transistor. The substrate is a glass substrate or a flexible polymer material substrate.

To sum up, the present invention can achieve the following effects:

The cost of using the gate driving module can be saved and the yield loss impacted by the thermal pressing process can be prevented.

Through the gate control signal mechanism of the present invention, the number of connection lines connected to the gate control circuit 40 can be greatly reduced. Simply put, the number of control signal connection terminals can be reduced. The number of control signal connection nodes is less than half of the number of gate lines of the pixel control array. This can be used for narrow frame design.

In the present invention, the plurality of gate driving circuit sets 42 are controlled many times and the time interval between two controls is not greater than 90% of the RC constant provided by the output impedance of the gate driving circuit 43 and the capacitance of the output equivalent capacitor Cg. Therefore, the correct voltage level of the gate line GL can be ensured.

It shall be understood that the present invention may have other types of embodiments, and a person with ordinary skills in the art of the technical field of the present invention may make various changes and modifications corresponding to the present invention without deviating the principle and substance of the present invention; however, such corresponding changes and modification shall be considered to be within the claimed scope of the present invention.

What is claimed is:

1. An electrophoretic display, comprising:
a substrate having a first surface and a second surface;
a pixel control array arranged on the second surface; and
a gate control circuit electrically connected to the pixel control array;
wherein the pixel control array comprises:

a plurality of pixel units, at least one of the pixel units comprising a pixel thin film transistor, a storage capacitor and a pixel electrode;
a plurality of gate lines, at least one of the gate lines connected to gates of the pixel thin film transistors of the plurality of pixel units;
a plurality of data lines, at least one of the data lines connected to sources or drains of the pixel thin film transistors of the plurality of pixel units; and
wherein the gate control circuit comprises:
a plurality of gate driving circuit sets, one of the gate driving circuit sets comprising a plurality of gate driving circuits, one of the gate driving circuits comprising a gate thin film transistor, wherein at least one of the gate thin film transistors is low conduction resistive thin film transistor, an output terminal of the gate driving circuit connected to the gate line of the pixel control array;
a plurality of control signal lines, one of the control signal lines connected to an input end of one of the gate driving circuits of the gate driving circuit sets;
a plurality of gate driving circuit set enable lines connected to enable control nodes of the gate driving circuits of the gate driving circuit sets;
wherein one of the gate driving circuits comprises an output equivalent capacitor.

2. The electrophoretic display in claim 1, wherein a capacitance value of the output equivalent capacitor is not less than 1 PF.

3. The electrophoretic display in claim 1, wherein an output terminal of the gate driving circuit is source or drain of the gate thin film transistor.

4. The electrophoretic display in claim 1, wherein the low conduction resistance is no more than 1M ohm.

5. The electrophoretic display in claim 1, wherein the low conduction resistance is no more than 100K ohms.

6. The electrophoretic display in claim 1, wherein a channel width/channel length (W/L) ratio of one of the gate thin film transistors is greater than 50/1.

7. The electrophoretic display in claim 1, wherein the enable control node of the gate driving circuit is gate of a thin film transistor with low conduction resistance.

8. The electrophoretic display in claim 1, wherein one of the gate driving circuits comprises a front-stage thin film transistor and a rear-stage thin film transistor with low conduction resistance, and the enable control node of the gate driving circuit is a gate of the front-stage thin film transistor.

9. The electrophoretic display in claim 1, wherein an output equivalent capacitance value of the output equivalent capacitor is provided by a capacitor formed by sandwiching an insulating layer between two conductive layers in a thin film transistor process.

10. The electrophoretic display in claim 1, wherein the pixel thin film transistors and the gate thin film transistors are amorphous silicon thin film transistors, organic thin film transistors, or indium gallium zinc oxide (IGZO) thin film transistors.

11. The electrophoretic display in claim 1, wherein the substrate is a glass substrate or a flexible polymer material substrate.

12. The electrophoretic display in claim 1, wherein output terminals of the plurality of gate driving circuit sets output three types of states including high voltage level, low voltage level and high output impedance.

13. The electrophoretic display in claim 1, wherein at least one output of the gate driving circuit sets is of high impedance at least once during image update period.

14. The electrophoretic display in claim 1, wherein output of 50% of the gate driving circuit sets are of high impedance at least once during image update period.

15. The electrophoretic display in claim 1, wherein output of 50% of the gate driving circuit sets are low voltage level at least once during the image update period.

16. The electrophoretic display in claim 1, wherein at least one output of the gate driving circuit sets is a high voltage level at least once during image update period.

17. The electrophoretic display in claim 1, wherein outputs of all gates of the gate driving circuit sets are low voltage level at least once during image update period.

18. The electrophoretic display in claim 1, wherein one end of the output equivalent capacitor is connected to a voltage level not less than zero volt.

19. The electrophoretic display in claim 18, wherein one end of the output equivalent capacitor is connected to a programmable voltage level.

20. The electrophoretic display in claim 1, wherein one end of the output equivalent capacitance is connected to an output end of an amplifier, and an output voltage of the amplifier changes with a voltage level of the gate line.

21. The electrophoretic display in claim 20, wherein the output voltage of the amplifier changes in complementary manner with a change in a voltage level of the gate line.

22. The electrophoretic display in claim 1, further comprising a tracking compensation circuit arranged between a sampling gate line and the output equivalent capacitance of each of the gate driving circuit sets, the tracking compensation circuit comprising a comparison circuit, a selection circuit, and an integrating circuit electrically connected to each other.

\* \* \* \* \*